P. L. BILLINGSLEY.
DADO MACHINE.
APPLICATION FILED MAY 19, 1909.

955,749.

Patented Apr. 19, 1910.
6 SHEETS—SHEET 1.

WITNESSES:
Thos. W. Riley
M. A. Newcomt.

INVENTOR
P. L. Billingsley
BY
W. J. FitzGerald & Co.
ATTORNEYS

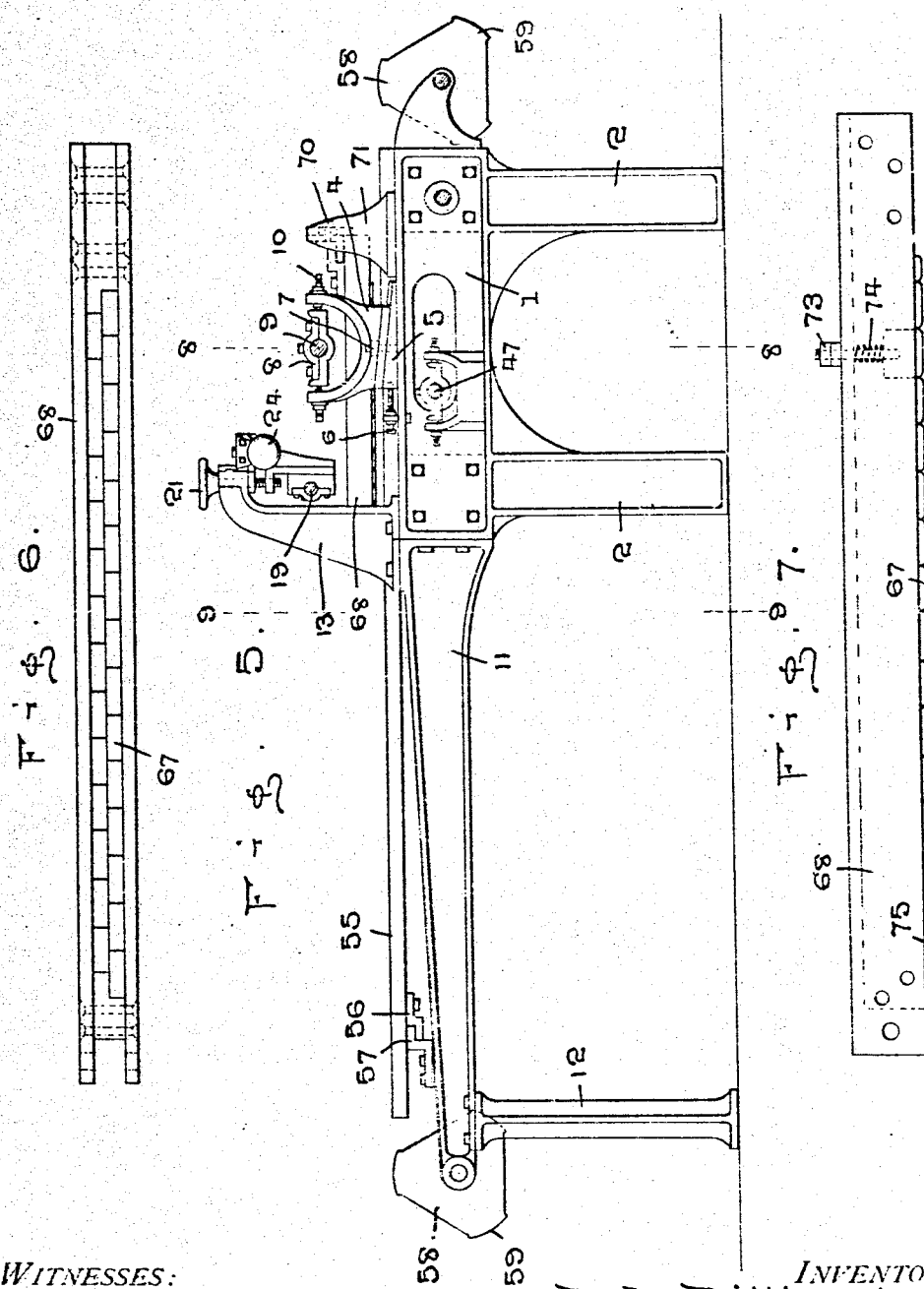

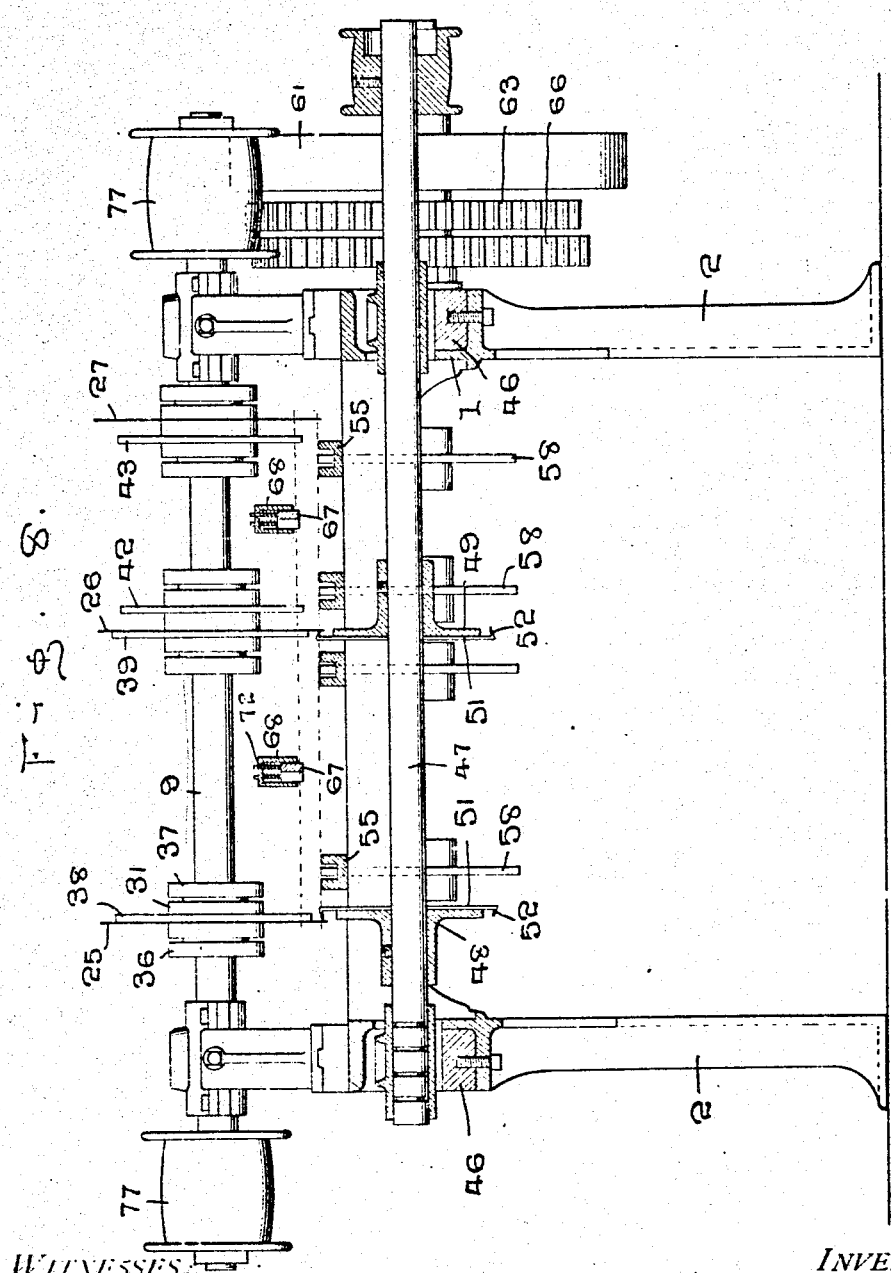

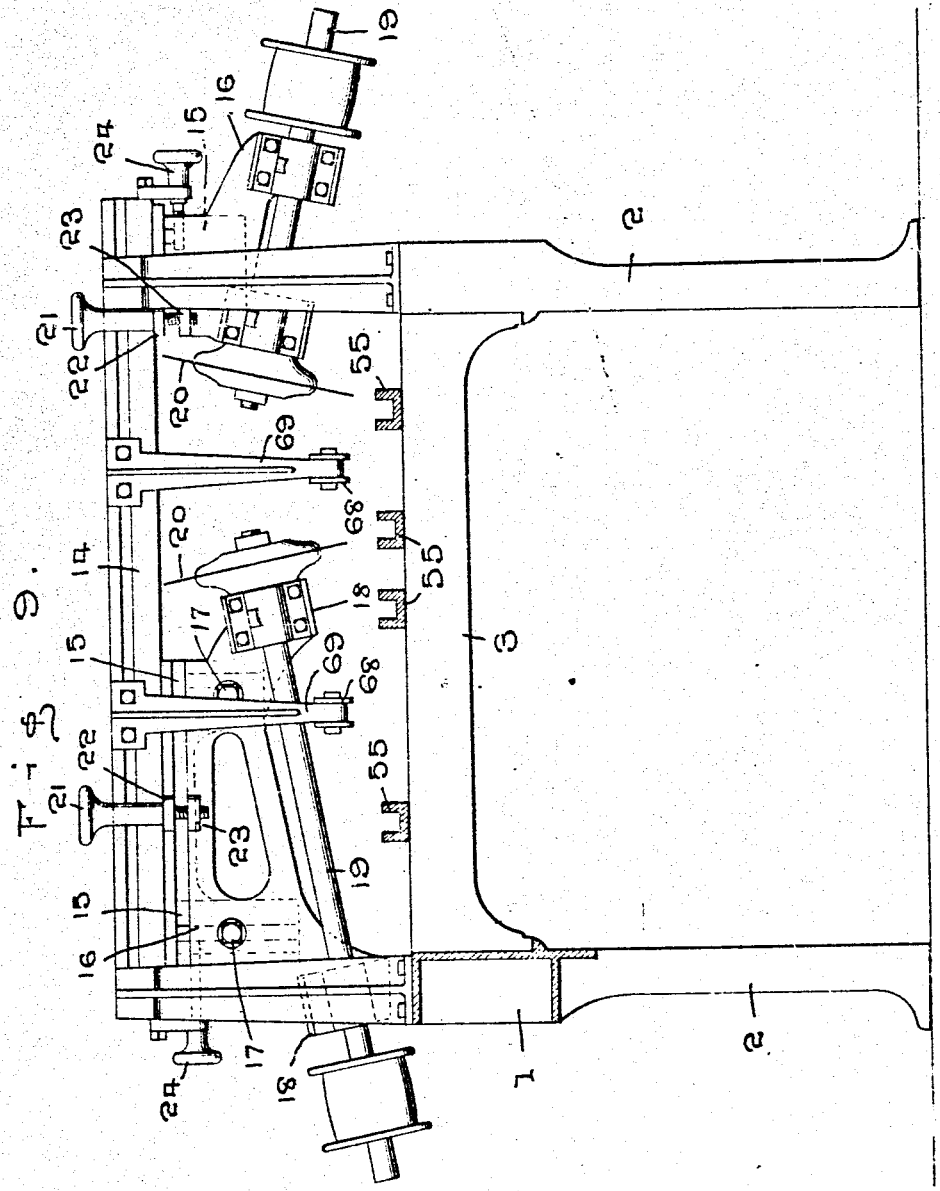

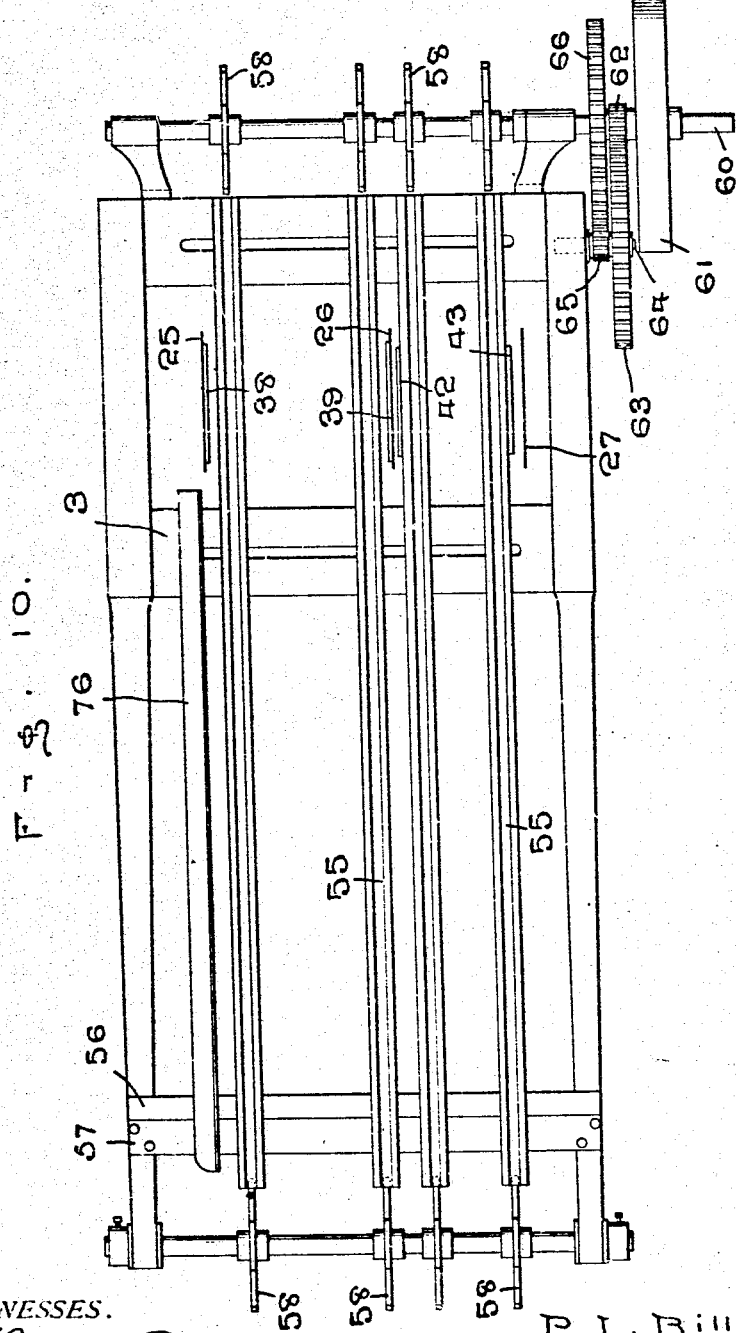

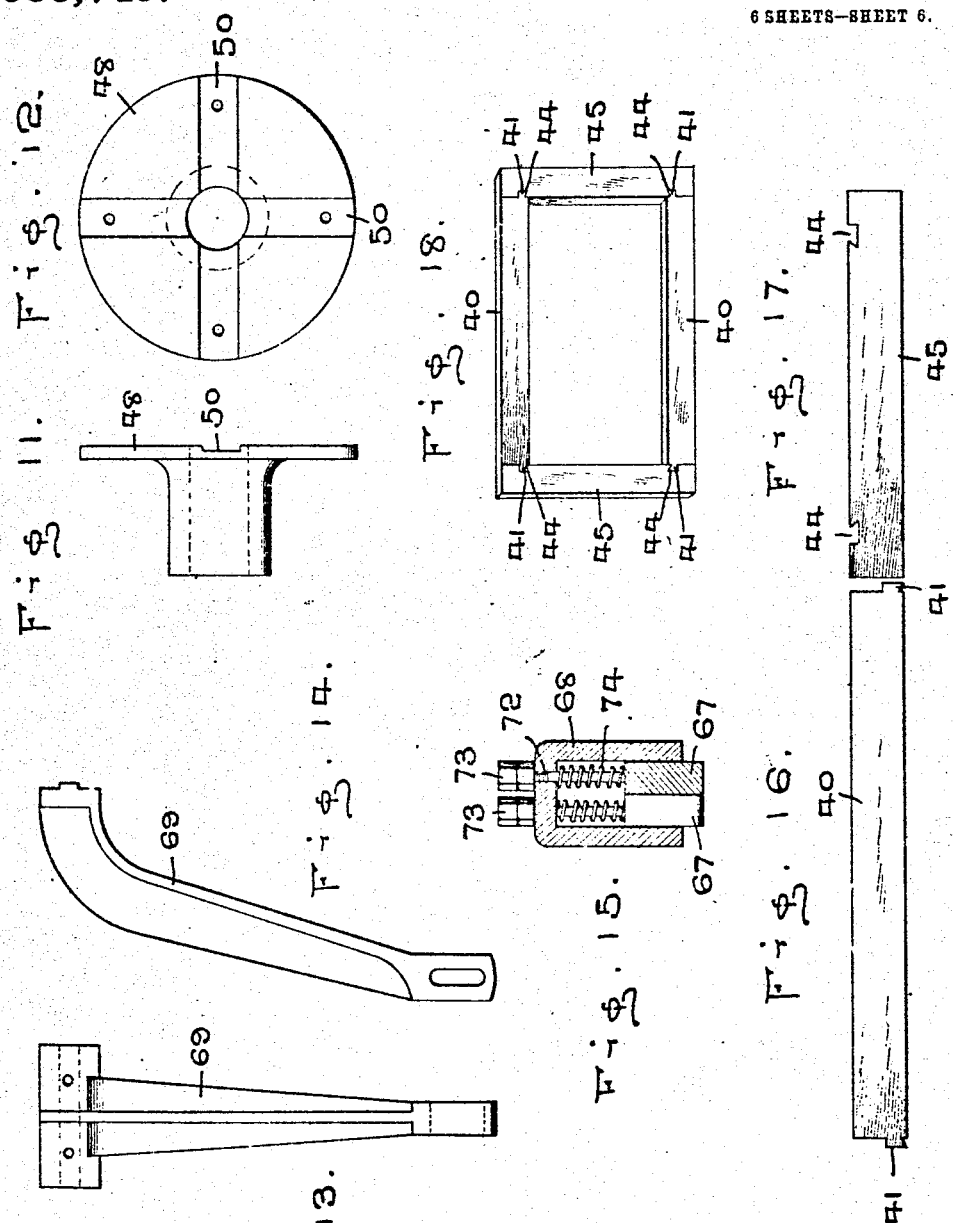

UNITED STATES PATENT OFFICE.

PERCY LEON BILLINGSLEY, OF OAK, FLORIDA.

DADO-MACHINE.

955,749.

Specification of Letters Patent.

Patented Apr. 19, 1910.

Application filed May 19, 1909. Serial No. 497,055.

*To all whom it may concern:*

Be it known that I, PERCY LEON BILLINGSLEY, a citizen of the United States, residing at Oak, in the county of Marion and State of Florida, have invented certain new and useful Improvements in Dado-Machines; and I do hereby declare the following to be a full, clear, and exact description of the invention, such as will enable others skilled in the art to which it appertains to make and use the same.

My invention relates to new and useful improvements in dado machines and more particularly to that class adapted to be used in forming frames for shipping boxes and my object is to provide means for forming a side and end section of the frame from one stick of timber.

A further object is to provide means for forming tongues on one of the sections and grooves in the other section.

A further object is to provide means for forming one or both of the edge walls of the tongues and grooves at an angle.

A further object is to provide means for moving the sticks of timber from end to end of the machine and direct pressure thereon.

A further object is to provide suitable means for adjustably mounting the various saws in position on their mandrels, whereby the sections will be cut in various lengths.

A further object is to provide means for adjusting the several parts of the machine to accommodate timbers of various lengths, and a still further object is to provide means for completing the two sections from one stick of timber, by passing the same once through the machine.

Other objects and advantages will be hereinafter referred to and more particularly pointed out in the claims.

Figure 1:
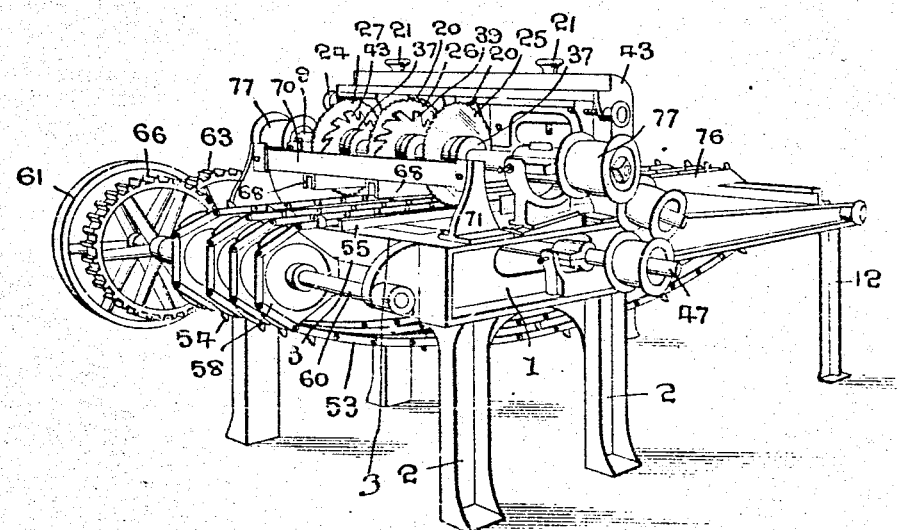
Figure 2:
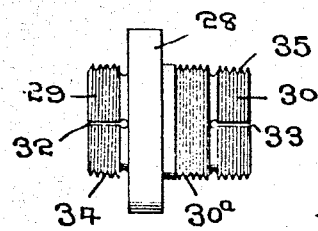
Figure 3:
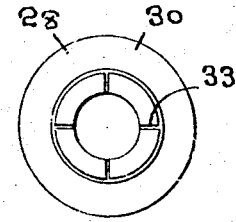
Figure 4:
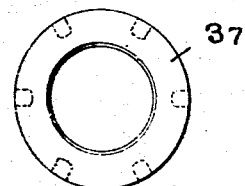

In the accompanying drawings forming part of this application, Figure 1 is a perspective view of the machine complete. Fig. 2 is a side elevation of a collar for mounting the saws on the mandrels or shafts. Fig. 3 is an end elevation thereof. Fig. 4 is a side elevation of a locking nut adapted to engage said collars and lock the same on the mandrel. Fig. 5 is a side elevation of the frame of the machine, showing parts thereof in section and parts removed. Fig. 6 is a bottom plan view of the presser bars employed for holding the timbers in position on the machine. Fig. 7 is a side elevation thereof. Fig. 8 is a sectional view as seen on line 8—8, Fig. 5. Fig. 9 is a sectional view as seen on line 9—9, Fig. 5. Fig. 10 is a top plan view of the machine frame showing parts thereof removed. Figs. 11 and 12 are edge and front elevations, respectively, of the head employed for holding certain of the cutting devices. Figs. 13 and 14 are edge and side elevations, respectively, of the arms employed for supporting the timber clamping mechanism. Fig. 15 is a transverse sectional view, on an enlarged scale, of the timber clamping mechanism. Figs. 16 and 17 are elevations of the two sections of the box end, as completed by passing through the machine, and, Fig. 18 is a perspective view of the completed and assembled box end frame.

Referring to the drawings in which similar reference numerals designate corresponding parts throughout the several views, 1 indicates the side rails of the machine frame and 2 the supporting legs therefor, said side rails being connected by means of cross strips 3, said parts being constructed in any suitable manner and held in their assembled positions by suitable bolts.

Mounted upon the side rails are brackets 4, the lower edges of which are inclined and adapted to engage an inclined block 5 positioned on the side rails 1, said brackets being slidably mounted on the blocks, while the blocks are adjustably mounted on the side rails, an adjusting screw 6 being mounted upon the side rails and engaging said blocks to move the same lengthwise, a bolt 7 being employed for clamping the brackets in their adjusted positions on their respective blocks. The upper ends of the brackets 4 are bifurcated and between the bifurcated ends are placed bearings 8, through which extends a mandrel or shaft 9, the bearings being adjustably held between the bifurcated ends of the brackets 4 by providing adjusting screws 10, which extend through the bifurcated ends and engage the ends of the bearings.

By providing the adjustable bracket, it will be readily seen that the mandrel may be raised or lowered and may be adjusted forwardly or rearwardly on the frame and that the blocks may be held perfectly true between the bifurcated ends of the bearings.

Attached to the rear end of the rails 1, 110 are auxiliary rails 11, which extend at a distance from the rails 1 and are supported with supporting legs 12 at their outer ends and resting upon the meeting ends of the rails 1 and 11, are standards 13, which are connected together at their upper ends by a slide bar 14, depending from which are plates 15, to which are adjustably secured hangers 16, said plates having elongated slots therethrough, through which extend bolts 17 to hold the hangers in adjusted position on the plates. The ends of the hangers 16 are provided with bearings 18, through which extend shafts 19, the bearings at the inner ends of the hangers being in a plane higher than the bearings at the outer ends thereof, thereby disposing the shafts at an incline whereby coping saws 20 attached to the inner ends of the shafts, will form an inclined incision in the timber as it passes below the saws, said saws being attached to the shafts in any suitable manner. The hangers 16 are adjusted vertically by means of adjusting screws 21, which pass through ears 22 on the bar 14 and are threaded through ears 23 on the hangers, while the hangers are adjusted longitudinally by means of adjusting screws 24 and by providing said screws, it will be readily seen that an accurate and minute adjustment of the hangers may be obtained.

The mandrel 9 has located thereon saws 25, 26 and 27, which saws are spaced apart, the saw 26 being adapted to cut the timber into sections, while the saws 25 and 27 are adapted to cut the ends of the timber and form the sections of proper length, said saws being fixed to collars 28, which collars are provided at opposite sides with hubs 29 and 30, a portion of the hub 30 adjacent the collar proper, having threads 30ª to receive a nut 31 to bind the saws on the collar, while the ends of the hubs are provided with slits 32 and 33, respectively, which divides the end of the hubs into segments of circles and permits the hubs to spring inwardly and tightly clamp the mandrel and the collars may be securely locked on the mandrel by tapering the outer faces of the hubs and providing threads 34 and 35 thereon, with which are adapted to engage nuts 36 and 37, respectively, the interior of said nuts being likewise tapered and provided with threads, so that the farther the nuts are turned onto the hubs, the greater the pressure of the segmental portions of the hubs on the mandrel. The saws 25 and 26 also have positioned adjacent their meeting faces and on the collars supporting said saws, dado cutters or saws 38 and 39, respectively, which cutters are adapted to remove portions of the end of the section 40 to form the flat face of the tenons 41, at the ends of said section 40, while between the saws 26 and 27 and on the collar supporting said saws, are similar cutters 42 and 43, which cutters are adapted to form the dove tail notches 44 in the section 45, the dove tail portions of the notches having previously been cut by the coping saws 20.

Rotatably mounted in adjustable bearings 46 on the side rails 1, is a shaft 47, on which are adjustably mounted disk-like heads 48 and 49, the faces of said heads having channels 50 therein, in which are to be seated and secured a number of bars 51 one set having saw edges and the other set having chamfering cutters 52 thereon, which are adapted to form the inclined or dovetail edge of the tenons 41, said dovetail portions of the tenons being formed while the timber is passed from engagement with the coping saws into engagement with the trimming and dado saws.

The strips of timber are fed below the various saws by means of a plurality of chains 53, which chains are endless and extend from end to end of the machine, one section passing above the bed portion of the machine and the other portion below the same, a portion of the links of the chain having fingers 54 thereon, which are adapted to engage a stick of timber and move the same bodily below the saws, that portion of the chain passing above the bed of the machine, extending through channel guides 55, which are adjustably attached to cross strips 3 and rest thereon, the rear ends of the guides 55 having a keeper 56 attached thereto, which is adapted to engage a retaining bar 57 adjacent the rear ends of the auxiliary rails 11, as best shown in Fig. 5 of the drawings.

Guide wheels 58 are rotatably mounted at each end of the machine, which forms bearings for and drive the chains 53 lengthwise of the machine, said wheels having tongues 59 thereon, which are adapted to extend through the links of the chain and positively drive the same, the forward guide wheels being adjustably mounted upon a shaft 60 and fixed thereto. The shaft 60 is driven through the medium of a pulley 61, which is loosely mounted upon said shaft 60 and fixed to a pinion 62, which pinion meshes with a gear 63 rotatably mounted on a stub shaft 64 and fixed to said gear 63 is a pinion 65, which meshes with a gear 66 fixed to the shaft 60, this manner of gearing, providing a uniform speed for the chains and at the same time requiring less power to operate the same.

The strips of timber when started into the machine, are adapted to rest edgewise on the upper edges of the channel guides 55 and are securely held in their edgewise position by means of presser bars or blocks 67, which blocks are mounted in channel bars 68, one end of the bars being pivotally and adjustably attached to the lower ends of supporting arms 69, while the opposite ends thereof are adjustably attached to a beam 70 carried between standards 71 on the forward end of the machine frame. The blocks 67 are arranged in the respective channel bars preferably in two series, one series breaking joints with the opposite series and they are adapted to have their lower edges protruding below the lower edges of the channel bars 68 and are supported by means of rods 72, which rods project upwardly through the upper wall of the channel bar in which they are mounted and have their upper ends engaged by nuts 73, whereby the distance at which said blocks protrude below the channel bars, may be regulated and to normally hold the blocks in their lowered positions and to direct downward pressure thereon, springs 74 are placed between the blocks and the upper ends of the channel bars and around said rods. The distance between the lower edges of the blocks and the upper edges of the guides 55 is less than the height of the piece of timber when standing edgewise, so that as the timber moves into engagement with said blocks, they will be successively elevated to permit the passage of the timber, thus directing the full tension of the springs on the timber to hold the same in its edgewise position, the corners of the lower edges of the blocks being rounded as best shown at 75 in Fig. 7. The arms 69 are laterally adjustable on the slide bar 14 and the forward ends of the channel bars 68 are likewise laterally adjustable on the beam 70, so that said channel bars 68 may be adjusted to the proper position to hold the timber while being sawed and as the timber is cut in two sections when completed, I provide two of the channel bars with their respective clamping blocks for holding said sections, a downward pressure being directed against the sections until they have passed all of the saws.

The various saws being adjustably mounted on the frame of the machine, may be moved to form two sections of the box end in uniform length to produce a square frame or to cut two sections in unequal lengths to form an oblong frame and after the various parts are properly set to produce the proper length sections, a timber is placed in position to be engaged by the fingers on the chain 53 and moved thereby toward and below the saws, one end of the timber when placed in position to be engaged by the fingers, being abutted against a guide plate 76. As the timber is moved forwardly, it first passes below the channel bars 68 and is engaged by the blocks carried thereby and is then moved into engagement with the coping saws 20 and inclined incisions made therein, thus forming the inclined wall of the notch 44. As the timber still moves forwardly, it is engaged by the cutting edges of the bars 51 and the chamfering plates carried thereby, which form the inclined edges of the tenons 41, a continued forward movement of the timber bringing the same into engagement with the saws 25, 26 and 27 and the dado cutters 38, 39, 42 and 43, the saws 25 and 27 severing the ends of the timber, while the saw 26 separates the timber to form the sections 40 and 45, while the dado cutters 38 and 39 form the straight edge of the tenons and the cutters 42 and 43 form the notches 44, thereby completing two sections of the box end frame from one piece of timber and by passing the same but once through the machine and in view of the number of fingers attached to the chain, the timbers may be rapidly fed into the machine.

What I claim is:

1. In a device of the character described, a plurality of timber holding blocks, said blocks being arranged in alternating series and means for the resilient retention of said blocks in effective position.

2. In a device of the class described, the combination with a frame; of means to move a timber from end to end of the frame, means to retain said timber edgewise, inclined saws adapted to form inclined incisions in the upper edge of said timber, a plurality of saws adapted to cut said timber in sections, a pair of cutters adapted to engage the upper edge of the timber adjacent the inclined incisions and form the end and bottom walls of notches, the inclined incisions forming the opposite walls thereof, a pair of similar cutting devices adapted to engage the ends of one of the sections of timber and form one edge of tenons and additional cutting devices adapted to form the opposite edge portions of the tenons, the last named cutting devices forming inclined faces.

3. In a device of the character described, a plurality of timber holding blocks, a channel member receiving said blocks, and means for the retention of said blocks in resilient effective position, said blocks being arranged in staggered relation to each other.

4. In a device of the class described, the combination with a frame, means to move a stick of timber from end to end of the frame, and cutting devices adapted to sever the timber into sections and form tenons on one section and notches in the opposite section, one face of the tenons and notches being inclined; of channel bars adjustably mounted above the path of said timber, a plurality of blocks carried by said channel bars and means to direct downward pressure thereon, whereby when the blocks are engaged with the timber, said timber will be held in position and retained edgewise on the frame.

5. In a device of the class described, the combination with a frame and means to move a stick of timber from end to end of the frame and additional means to hold said timber edgewise on the frame; of a pair of inclined shafts mounted on the frame, saws fixed to said shafts and adapted to form incisions in the timber at an incline, means to adjust said shafts on the frame, saws adapted to sever the timber into sections and means to form tenons on one of the sections one face of which is inclined and additional means to form notches in the opposite section.

6. In a device of the character described, a plurality of timber holding blocks arranged in alternating series, a channel member for the reception of said blocks, said blocks having upwardly extending rods connected to their upper ends and springs applied to said rods within said channel member.

7. In a device of the character described, timber holding blocks arranged in alternating series, a channel member inclosing said blocks, said blocks having outwardly extending rods connected to their upper ends and projecting through the upper portion of said casing, adjusting means applied to said rods external to said casing, and springs encompassing said rods intermediate of said blocks and said casing.

In testimony whereof I have signed my name to this specification in the presence of two subscribing witnesses.

PERCY LEON BILLINGSLEY.

Witnesses:
   F. W. WEBBER,
   MARY WEBBER.